United States Patent [19]

Blanding

[11] 3,813,528

[45] May 28, 1974

[54] HIGH-SPEED FUNCTION GENERATOR

[75] Inventor: Curtis J. Blanding, San Jose, Calif.

[73] Assignee: The Singer Company, Binghamton, N.Y.

[22] Filed: June 2, 1972

[21] Appl. No.: 258,953

[52] U.S. Cl. .................................. 235/152, 235/197

[51] Int. Cl. ............................ G06f 1/02, G06f 15/34

[58] Field of Search ...... 235/152, 150.53, 197, 186; 340/172.5

[56] References Cited

UNITED STATES PATENTS

| | | | |
|---|---|---|---|
| 3,569,684 | 3/1971 | Burnett | 235/152 |
| 3,633,017 | 1/1972 | Crooke et al. | 235/152 X |
| 3,654,450 | 4/1972 | Webb | 235/152 X |
| 3,676,655 | 7/1972 | Ancona | 235/197 X |

OTHER PUBLICATIONS

Reference Data for Radio Engineers, Fed. Telephone and Radio Corp., 1946, pg. 306.

*Primary Examiner*—Malcolm A. Morrison
*Assistant Examiner*—James F. Gottman
*Attorney, Agent, or Firm*—William Grobman; James C. Kesterson

[57] ABSTRACT

A device for generating the value of the sine and cosine functions for angles between 0° and 360° is disclosed herein. By employing the symmetrical characteristics of the sine and cosine functions, a table of values for the sine function between 0° and 90° is the extent of the memory requirements. A read-only memory is disclosed for storing the table of values, and peripheral circuitry is provided for translating from the sine to the cosine functions as well as translating to angles between 90° and 360° for both functions. Additional circuitry is disclosed for providing the resultant output value in true binary form, or two's complement form.

6 Claims, 9 Drawing Figures

HIGH-SPEED FUNCTION GENERATOR

BACKGROUND OF THE INVENTION

1. Field of the Invention

The present invention relates to an electronic device for generating, at high speeds, individual values of a given function in response to values functionally related thereto, and more particularly to a device for generating the values of the sine and cosine functions in response to input information representing angles between 0° and 360°.

2. Description of the Prior Art

In the past, values for the sine and cosine functions have been generated by digital computers employing two well-known techniques. The first of these was a solution of the equation for the sine function expressed as a series expansion.

$$\mathrm{Sin}X = X - X^3/3! + X^5/5! - X^7/7! + \ldots$$

The cosine function was generated in a similar manner by use of the series expansion:

$$\mathrm{Cos}X = 1 - X^2/2! + X^4/4! - X^6/6! + \ldots$$

The computer would perform each of the individual computations of these series, in sequence, until a final answer was generated. By adding terms to these equations, accuracy could be improved. However, the time required to compute a reasonably accurate answer would be 150 to 200 microseconds per calculation. In many systems today, such as flight simulators, it is necessary to compute these functions at a much greater speed.

Another technique of using a computer to generate the sine and cosine functions was to store a table of values in the computer memory, and then select these values in response to input angles. The input angles were, in effect, addresses to the memory; and the outputs from the memory would be the values of the functions at the given input angles. This technique reduced the time required to generate an individual value to 40 microseconds. However, a disadvantage in using this method was the large portion of the memory that was required for storing these values, which memory portion better could be used in performing other operations.

More recently, devices have been developed which contain a read-only memory that has stored therein a table of values for the sine and cosine functions. A read-only memory consists of a multiplicity of cells which store binary information. These cells are divided into groups, wherein each group consists of a given number of cells. Each of these individual groups of cells stores a particular combination of binary digits that represents a particular value. Once the value is stored within the cells, it will remain permanently stored therein. A provision is made within the read-only memory for addressing each of these groups of cells in response to various combinations of input signals. A read-only memory operates at a very high speed and, therefore, reduces the time required for generating values for the sine and cosine functions in response to input angular values. The use of read-only memories also overcame the disadvantage of using the computer memory for storing the table of values. However, to increase the accuracy of the generated values, it was necessary to employ a large read-only memory. An even larger read-only memory was required for generating both the sine and cosine functions for angles within the range of 0° to 360°.

Prior art techniques have been developed for reducing the size of the read-only memory somewhat by dividing the value of the input angle into two parts. One part represents a large fraction of this value, and the other smaller part is the balance thereof. These prior art techniques use the well-known trigonometric identity for the sum of two angles:

$$\mathrm{Sin}(A + B) = \mathrm{Sin}A\ \mathrm{Cos}B + \mathrm{Cos}A\ \mathrm{Sin}B,$$

wherein A equals a large part of the input angular value, and B represents the smaller part. If the value of B is always a small fractional value of the input angle, then the cosine of this part (i.e., CosB) may be assumed equal to one. Then the equation above becomes:

$$\mathrm{Sin}(A + B) = \mathrm{Sin}A + \mathrm{Cos}A\ \mathrm{Sin}B.$$

Even though this prior art technique did help reduce the size of the memory requirements, it was still a large and complex device.

However, this invention discloses new and improved means and methods for further reducing the cost, size, maintenance, and the time required for a computation. It will be shown in the detailed description hereinbelow that the present invention mitigates the disadvantages of using large memories for generating the value of the sine and cosine functions from 0° to 360°.

SUMMARY OF THE INVENTION

Accordingly it is a fundamental object of the present invention to provide a new and improved device for deriving mathematical functions.

It is another object of the present invention to provide new and improved electronic circuits.

It is a still further object of this invention to provide a device that will generate the sine and cosine functions for angles within the range of 0° to 360°, and which requires a relatively small amount of memory therefor.

It is another object of the present invention to provide a sine and cosine function generator which has a very high speed of operation.

A still further object of the present invention is to provide a sine and cosine function generator which has capabilities of providing negative output answers in true binary or in complementary form.

It is another object of the present invention to provide a sine and cosine function generator which is relatively simple in construction and inexpensive to build.

A still further object of the present invention is to provide a sine and cosine function generator which can compute the value of the sine and cosine function for a randomly selected angle between 0° and 360°.

It is another object of the present invention to generate the sine and cosine function for angles between 0° and 360° which produces no abnormal slope reversals.

It is a still further object of the present invention to provide a sine and cosine function generator which is asynchronous in operation.

A feature of the present invention resides in the provision of circuits for supplying address values to a read-only memory in either true binary form or two's complement form.

Another feature of the present invention resides in the provision of a simplified means for complementing the final output.

A primary advantage of the present invention over similar devices of the prior art is that the sine and cosine functions may be generated within 500 nanoseconds per computation for angles within the range of 0° to 360°, which employs a relatively small read-only memory.

These and other objects, features and advantages of the present invention will become clear to one normally skilled in the art from a perusal of the appended specification when taken in conjunction with the drawings.

DETAILED DESCRIPTION OF THE PREFERRED EMBODIMENT THEORY

The present invention is designed to compute the values of the sine and the cosine functions of angles between 0° and 360°. Angular values may be provided to the system of this invention from any suitable source such as, for example, from a computer or a switching network. An indication of the quadrant in which the angle is located and the function to be computed (sine or cosine) are also required as inputs to this system. The output values of the system of this invention may be supplied as inputs to a computer, or to any form of digial display unit. The system of this invention has particular application as a special purpose component of a computer system which requires rapid computation of the values of the sine and cosine. However, this sytem may also be employed as a separate unit.

Before describing the circuitry of the preferred embodiment, a description of the theory of operation will be helpful in understanding the system of the present invention. Symmetrical characteristics of both the sine and cosine functions, and the relationship between them, make it possible to obtain the values of these functions between 0° and 360° by providing a read-only memory which has stored therein the values for the sine of angles between 0° and 90°.

This is effected by electronic circuitry and a read-only memory, which will be explained in greater detail hereafter following a description of the theory of operation.

Two fundamental principles of trigonometry are employed in the specific embodiment as disclosed herein. First, the cosine of an angle is equal to the value for the sine of the complement of the given angle. That is:

$$\mathrm{Cos}A = \mathrm{Sin}\ (90° - A). \qquad [1]$$

Secondly, if the angle A is expressed as the sum of two angles, then:

$$\mathrm{Sin}A = \mathrm{Sin}(B + C) = \mathrm{Sin}B\ \mathrm{Cos}C + \mathrm{Cos}B\ \mathrm{Sin}C \qquad [2]$$

Wherein $B + C = A$

Figure 1:
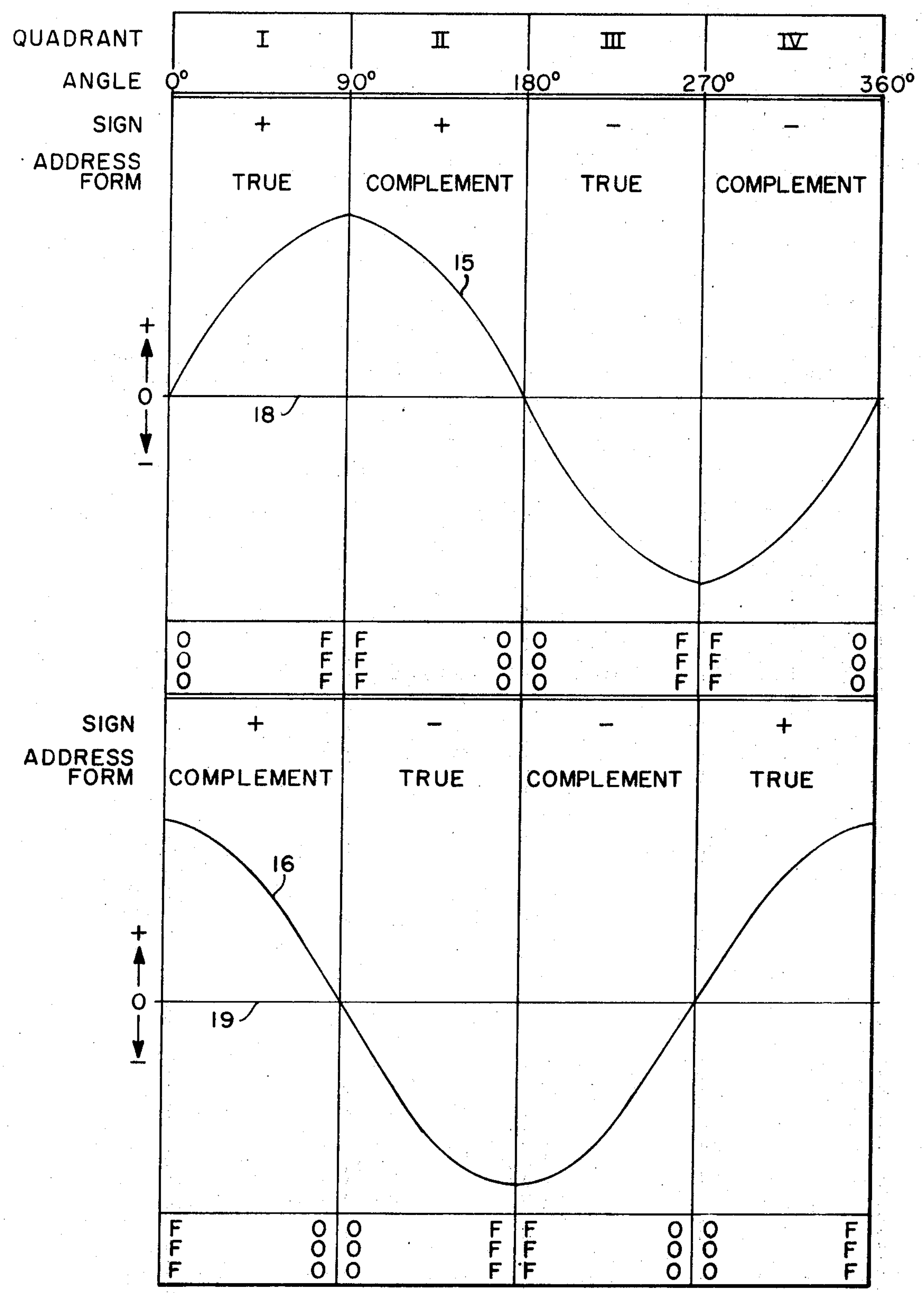
FIG. 1 is a graphical diagram of the four-quadrant characteristics of the sine and cosine functions.

FIG. 1 comprises curves 15 and 16 which show the relationship between the sine and the cosine functions, respectively. The curves are broken up into four quadrants, which are designated herein by roman numerals I, II, III and IV. Each quadrant represents one-fourth of 360°, or 90°. A base line 18 divides sine curve 15 into positive and negative portions, and in a similar manner a base line 19 divides cosine curve 16 into positive and negative portions. Therefore, it can be seen that sine curve 15 is positive in quadrants I and II, and negative in quadrants III and IV. Also, cosine curve 16 is positive in quadrants I and IV, and negative in quadrants II and III. It can also be seen that curve 15 is out of phase with curve 16 by 90°, which is explained by the relationship expressed in equation [1].

For reasons which will become evident below, the system of this invention employs a base-16 numbering system. This may be clarified by an example. In writing a number, the value of any digit within that number depends on its position. The number 368.94 in the well-known base 10 system may be broken down as follows: $368.94_{(10)} = 3 \times 10^2 + 6 \times 10 + 8 \times 10^0 + 9 \times 10^{-1} + 4 \times 10^{-2}$ However, if the same number were in another base, such as base 16, the number would be broken down as follows: $368.94_{(16)} = 3 \times 16^2 + 6 \times 16 + 8 \times 16^0 + 9 \times 16^{-1} + 4 \times 16^{-2}$ It is pointed out that the value of this number is equal to 872.58 in the base 10 system. The base 16 numbering system is also commonly referred to as hexadecimal. Table 1 is included herein for reference.

TABLE 1

| DECIMAL | BINARY | HEXADECIMAL |
|---|---|---|
| 0 | 0000 | 0 |
| 1 | 0001 | 1 |
| 2 | 0010 | 2 |
| 3 | 0011 | 3 |
| 4 | 0100 | 4 |
| 5 | 0101 | 5 |
| 6 | 0110 | 6 |
| 7 | 0111 | 7 |
| 8 | 1000 | 8 |
| 9 | 1001 | 9 |
| 10 | 1010 | A |
| 11 | 1011 | B |
| 12 | 1100 | C |
| 13 | 1101 | D |
| 14 | 1110 | E |
| 15 | 1111 | F |

The angle, whose sine or cosine is to be computed, is termed the input angle and is supplied in the form of a 12-digit binary number. This number may be depicted as:

XXXX XXXX XXXX wherein X represents a binary digit which may be a 0 or a 1 in any position.

From Table 1 above, it may be seen that a four digit binary number can represent the same values as a single hexadecimal digit. therefore, it follows that a 12-digit binary number representative of an angle may be expressed as a three-digit hexadecimal number. Hereafter, hexadecimal numbers will be used in the description except in those situations which require a detailed explanation of a single digit.

The angular value is provided as an input to the system of this invention in the form of a three-digit hexadecimal number. Circuits are provided which subdivide this number into two parts. The first part consists of the two most significant digits which represent B in equation [2] above; and the second part consists of the least significant digit which represents C in equation [2]. This definition is valid mathematically by the principle of multiplying each digit by the magnitude of each position, and summing the individual products, as shown herein above.

Figure 2:
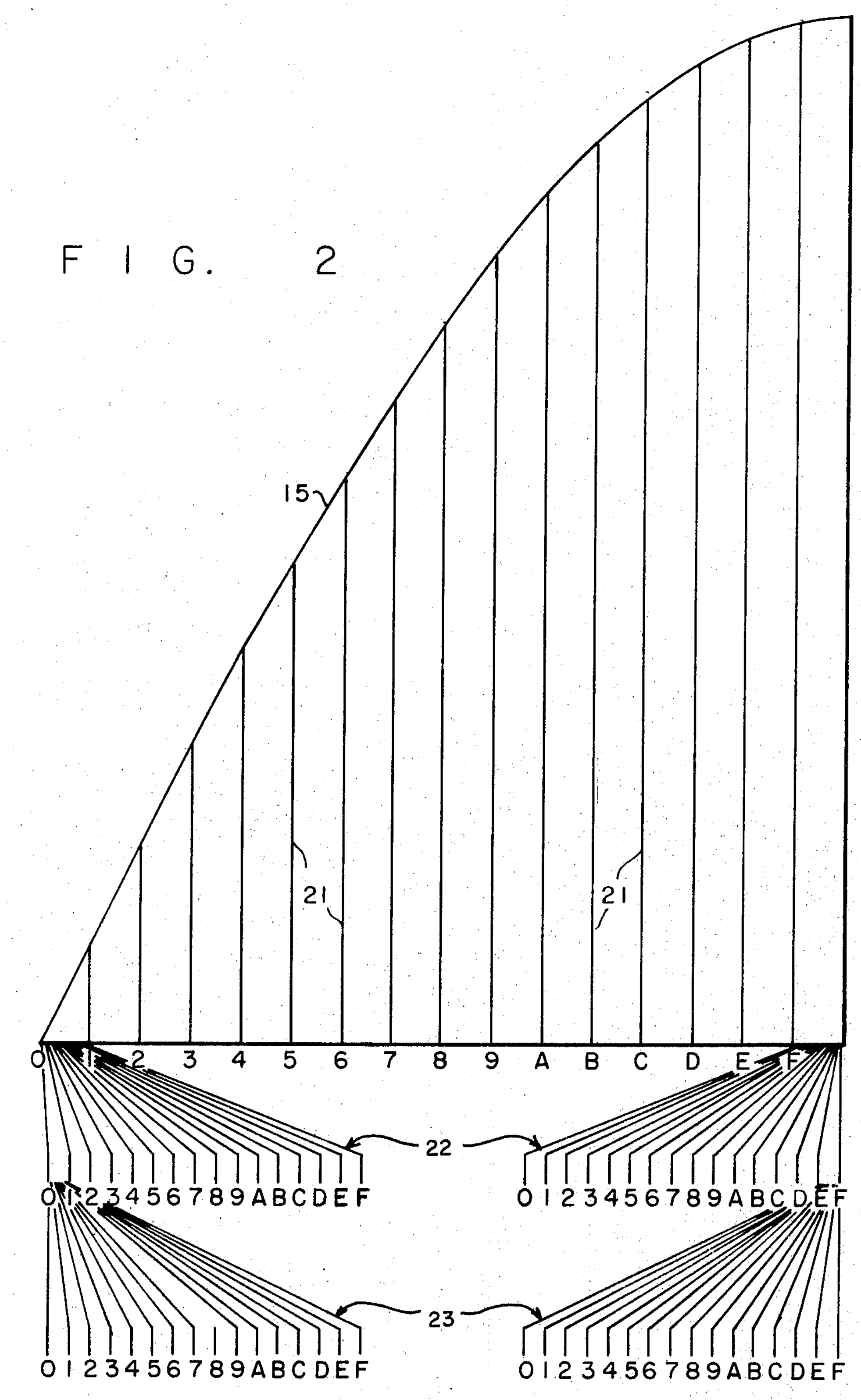
FIG. 2 is a graphical diagram of the angular divisions of one quadrant of a sine curve as used in the present invention.

FIG. 2 shows sine curve 15 between 0° and 90° (quadrant I). Vertical lines 21 divide the 90° of the curve into 16 equal parts; lines 22 divide equally each of these parts into 16 small parts; and lines 23 divide equally each of these small parts into 16 smaller parts. Therefore, the 90° of curve 15 are divided into 4,096 ($16^3$) equal parts; and each of these parts may be identified by the three-digit hexadecimal number representative of that angle; whereby 000 equals 0° and FFF equals approximately 90° (actually 4095/4096 parts of 90°). Lines 21 represent demarcations which correspond to the most significant digit of the hexadecimal number; lines 22 represent demarcations which correspond to the second most significant digit; and lines 23 represent demarcations which correspond to the least significant digit.

It follows from the above that each increment of the least significant digit adds a change of 1/4096 × 90°, or 0.022°, to the angle. The maximum possible change made in the angle by this digit is 15/4096 × 90°, or 0.33°. Therefore, the variable C in equation [2] above is very small. Reference to a standard five-place trigonometry table reveals that Cos 0.33° = 0.99993. As the value of C decreases, the value of its cosine approaches one. Hence, the term "CosC" of equation [2] may be assumed equal to one without introducing significant error in the answer. Equation [2] may be rewritten as follows:

$$\mathrm{Sin}(B + C) \approx \mathrm{Sin}B + \mathrm{Cos}B\ \mathrm{Sin}C \quad [3]$$

Likewise, Sin 0.33° = .00582, and as the value of C decreases the value of its sine approaches zero. Since the term "SinC" is a very small value, the most significant digit of the hexadecimal number representative of an angle may be employed as an average value of B in computing the term "CosB SinC" of equation [3]. This average value for the two most significant digits will hereafter be referred to as B'. The substitution of the average value B' for B introduces a very small error in the final answer, since the product of a very small number by a number which may contain a small error thereby introduces a much smaller error.

Equation [3] may be represented as follows:

$$\mathrm{Sin}(B + C) \approx \mathrm{Sin}B + \mathrm{Cos}B'\ \mathrm{Sin}C \quad [4]$$

This particular form of equation [2] is implemented by the circuits of this invention.

As stated hereinabove a memory is employed for storing values of the sine function between 0° and 90°. The particular memory employed is a read-only memory (ROM), which is distinguished from conventional memories in that it is initially programmed with binary data which cannot be changed once the data is stored in the ROM. The ROM comprises a multiplicity of cells arranged in groups, which cells store binary digits (0 or 1). Each group of cells stores a unique binary number. When an address for a specific group of cells is provided at an input to the ROM, the binary number stored in that group of cells is supplied at the output thereof. With reference to the system of the present invention, each binary number stored within each group of cells is the value for the sine function, and the address is the three-digit hexadecimal number representing the input angle.

One example of a preferred embodiment, which was constructed, employed a ROM which was subdivided into two parts. The first part, hereafter ROM-I, stored 256 unique values for the term "SinB" in equation [4]; and the second part, hereafter ROM-II, stored 256 unique values for the term "CosB'·SinC". ROM-II was organized into 16 sets of 16 groups of cells per set to compensate for changes in the slope of sine curves 15 as the angle changed. The 16 sets were addressed, respectively, by the 16 possible values of B' (the most significant digit of the three-digit hexadecimal number); and the 16 groups of cells within a given set were addressed, respectively, by the 16 possible values of C (the least significant digit of the three-digit hexadecimal number).

This preferred embodiment added the values supplied at the output of ROM-I to the values at the output of ROM-II to derive the final answer. For example, the first set of 16 values were added to the values from ROM-I when B' was zero, the second set of 16 values were added to ROM-I values when B' was one, and so forth to the angle where B' was equal to F wherein the 16 set of values were added to the ROM-I values. The total number of possible output answers is not necessarily the product of the number of values stored in ROM-I by the number of values stored in ROM-II.

As shown hereinabove, the three-digit hexadecimal number representative of the input angle has 4,096 possible values from 000 to FFF. There are 16 possible values provided at the output of ROM-I between each change in the value of B', and there are 16 possible values for B'. It can be seen that there are 256 possible values provided at the output of ROM-I. Between each of these 256 values there are 16 possible values from the output of ROM-II. A given set of 16 values from ROM-II is addressed as a function of the slope of curve 15 within a given range of angles, and more particularly by the value of B'. Therefore, it follows from the above that the preferred embodiment, which was constructed, provided 4,096 (256 values in ROM-I multiplied by 16 values in ROM-II) possible answers. It may be seen from FIG. 2, and the discussion therewith, that this number corresponds to the number of subdivisions of sine curve 15 between 0° and 90°.

Table 2 shows a list of some of the values, in hexadecimal form, which were stored within ROM-I and ROM-II of the preferred embodiment. The input angles are shown in the first column in degrees.

TABLE 2

| Device Input Angle (degrees) | Address B | Sin B | Address C | Cos B' Sin C | Device Output |
|---|---|---|---|---|---|
| 0.00 | 00 | 0.FFFE | 0 | 0.0000 | 0.0000 |
| 0.02 | 00 | 0.FFFE | 1 | 0.000C | 0.000C |
| 0.04 | 00 | 0.FFFE | 2 | 0.0019 | 0.0019 |
| 0.06 | 00 | 0.FFFE | 3 | 0.0025 | 0.0025 |
| 0.08 | 00 | 0.FFFE | 4 | 0.0032 | 0.0032 |
| 0.10 | 00 | 0.FFFE | 5 | 0.003E | 0.003E |
| 0.13 | 00 | 0.FFFE | 6 | 0.004B | 0.003B |
| 0.15 | 00 | 0.FFFE | 7 | 0.0057 | 0.0057 |
| 0.17 | 00 | 0.FFFE | 8 | 0.0064 | 0.0064 |
| 0.19 | 00 | 0.FFFE | 9 | 0.0070 | 0.0070 |
| 0.21 | 00 | 0.FFFE | A | 0.007D | 0.007D |
| 0.24 | 00 | 0.FFFE | B | 0.0089 | 0.0089 |
| 0.26 | 00 | 0.FFFE | C | 0.0096 | 0.0096 |
| 0.28 | 00 | 0.FFFE | D | 0.00A3 | 0.00A3 |
| 0.30 | 00 | 0.FFFE | E | 0.00AF | 0.00AF |
| 0.32 | 00 | 0.FFFE | F | 0.00BC | 0.00BC |
| 0.35 | 01 | 0.0190 | 0 | 0.0000 | 0.00C9 |
| 0.37 | 01 | 0.0190 | 1 | 0.000C | 0.00D5 |
| . | . | . | . | . | . |
| . | . | . | . | . | . |
| . | . | . | . | . | . |
| 22.50 | 40 | 0.61F8 | 0 | 0.0000 | 0.30FD |
| 22.52 | 40 | 0.61F8 | 1 | 0.000B | 0.3108 |
| 22.54 | 40 | 0.61F8 | 2 | 0.0016 | 0.3113 |
| 22.56 | 40 | 0.61F8 | 3 | 0.0021 | 0.311E |
| 22.58 | 40 | 0.61F8 | 4 | 0.002D | 0.312A |
| 67.50 | C0 | 0.EC8A | 0 | 0.0000 | 0.7646 |
| 67.52 | C0 | 0.EC8A | 1 | 0.0003 | 0.7649 |
| 67.54 | C0 | 0.EC8A | 2 | 0.0007 | 0.764D |
| 67.56 | C0 | 0.EC8A | 3 | 0.000B | 0.7651 |
| 67.59 | C0 | 0.EC8A | 4 | 0.0010 | 0.7656 |
| . | . | . | . | . | . |
| . | . | . | . | . | . |
| . | . | . | . | . | . |
| 87.87 | FA | 0.FFD7 | 0 | 0.0000 | 0.7FEC |
| . | . | . | . | . | . |
| . | . | . | . | . | . |
| . | . | . | . | . | . |
| 88.22 | FB | 0.FFE5 | 0 | 0.0000 | 0.7FF3 |
| . | . | . | . | . | . |
| . | . | . | . | . | . |
| . | . | . | . | . | . |
| 88.59 | FC | 0.FFEE | 0 | 0.0000 | 0.7FF8 |
| . | . | . | . | . | . |
| . | . | . | . | . | . |
| . | . | . | . | . | . |
| 88.94 | FD | 0.FFF7 | 0 | 0.0000 | 0.7FFC |
| . | . | . | . | . | . |
| . | . | . | . | . | . |
| . | . | . | . | . | . |
| 89.29 | FE | 0.FFFB | 0 | 0.0000 | 0.7FFE |
| 89.64 | FF | 0.FFFD | 0 | 0.0000 | 0.7FFF |
| 89.84 | FF | 0.FFFD | 9 | 0.0000 | 0.7FFF |
| 89.86 | FF | 0.FFFD | A | 0.0000 | 0.7FFF |
| 89.89 | FF | 0.FFFD | B | 0.0000 | 0.7FFF |
| 89.91 | FF | 0.FFFD | C | 0.0000 | 0.7FFF |
| 89.93 | FF | 0.FFFD | D | 0.0000 | 0.7FFF |
| 89.95 | FF | 0.FFFD | E | 0.0000 | 0.7FFF |
| 89.97 | FF | 0.FFFD | F | 0.0000 | 0.7FFF |

The B portions of the address (first two significant digits of the three-digit hexadecimal number) are shown adjacent to the column listing corresponding values for "SinB." The most significant digits of the B portions of the address are the values for B'. The C portions of the address (least significant digit of the three-digit hexadecimal number) are shown adjacent to the column listing the corresponding values for "CosB'·SinC". The values for "SinB" are provided at the output of ROM-I when the corresponding B addresses are supplied as an input thereto. The values for "CosB'·SinC" are provided at the output of ROM-II when the corresponding C addresses and B' addresses are jointly supplied as inputs thereto. It is pointed out that the values in the "SinB" and "CosB'·SinC" columns are fractional hexadecimal numbers since the device constructed in accordance with the principles of the present invention was designed to receive the input angle in $\pi$ radians in lieu of degrees. The angles listed in the "device input angle" column are expressed in degrees as a convenience for reading Table 2.

A "device output" column lists some of the 4,096 values which are provided at the output of this invention in response to the application of the corresponding device input angles. The values in the "device output" column are a sum of the values in the "SinB" and "CosB'·SinC" columns, and are likewise fractional hexadecimal numbers. However, it is pointed out that the values in the "SinB" column are less in value by a factor of two, which will be explained in greater detail hereinbelow. A simple addition of the values shown in the "SinB" column to the values in the "CosB'·SinC" column will not yield the values in the "device output" column. Also, the values in the "device output" column contain a sign digit in the most significant digit position. In the sign digit position a binary zero represents a positive value, and a binary one represents a negative value. Therefore, when the sine function is generated for an angle in either quadrant I or II this digit will be a 0, and when the angle is in quadrant III or IV this digit is a 1. Likewise, when computing the cosine function for angles in quadrants I and IV this digit will be a 0, and for angles in quadrants II and III this digit will be a 1.

Figure 3:
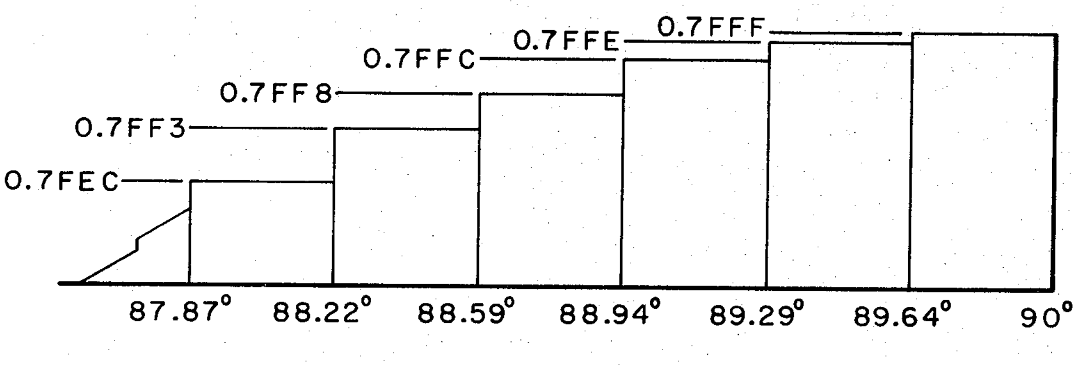
FIG. 3 is a graphical diagram of the functional relationship of the output values to input angles near 90° as generated by the device of this invention.

Due to a decrease in the slope of the sine curve near 90°, a change is made in the method for generating the values of the functions. When values are to be derived between 87.87° and 90°, the values for the term "CosB'·SinC" are assumed equal to zero. Therefore, it may be seen from Table 2 that values within this range do not change for changes in address C. This may be better understood from the diagram shown in FIG. 3. Between the angle 87.87° and 88.22°, the slope of output curve 24 is flat. An abrupt change in the output value occurs at 88.22°, and likewise, the slope of curve 24 between 88.22° and 88.59° is flat. These steps occur at each division demarcated by lines 22 up to 90°.

The values stored in the read-only memory, some of which are shown in Table 2, represent values for the sine function between 0° and 90°. The address (three-digit hexadecimal number) ranges from a value of 000 at 0° to FFF at 89.97°, and the value of a given address input angle is a proportion of the total possible value of FFF. The difference between a given address and FFF is the complement of the address. Therefore, by the correspondence of the addresses to the 4,096 angular subdivisions of 90°, it follows that the complement of the address is the complement of the input angle.

Figure 4:
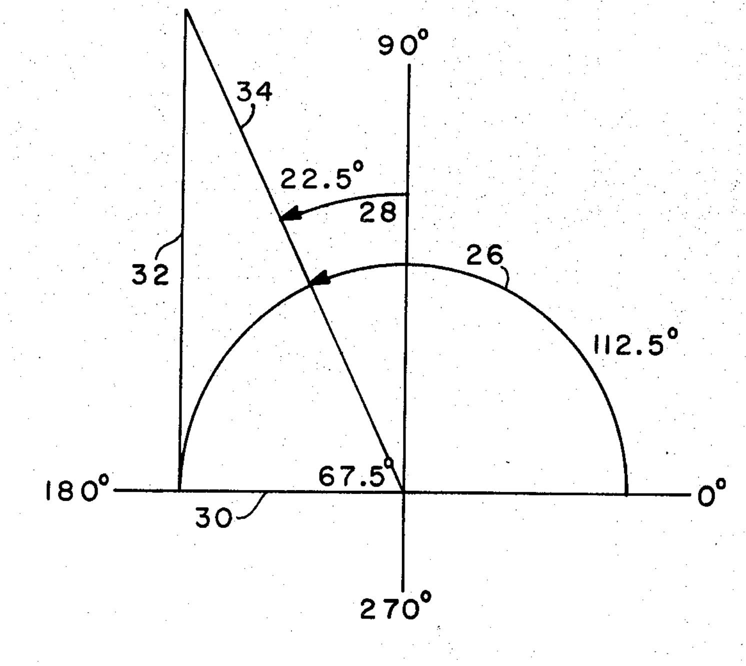
FIG. 4 is a graphical diagram of an angle in quadrant II as interpreted by the device of this invention.

According to a convention used in mathematics for graphically representing angles between 0° and 360°, an individual angle is measured in a counter-clockwise direction from 0°. As shown in FIG. 4, an angle of 112.5° is measured in a counter-clockwise direction, and is illustrated by arc 26. An alternate method of representing angles between 0° and 360° can be used wherein angular values are limited between 0° and 90°, and additional input information provided to designate the quadrant in which the angle is located.

The alternate method described above was employed in the system of the preferred embodiment which was constructed. Angular values were measured from 0° up to a maximum of 90°, and quadrant input signals were provided for designating the quadrant in which the angle was located. The angle of 112.5° was represented as an input angular value of 22.5° (112.5° − 90° = 22.5°), which is defined by arc 28, and the quadrant input signals caused the circuitry of the present invention to interpret this value as an angle in quadrant II. A right triangle is formed by base side 30, opposite 32, and hypotenuse 34. The included angle is 67.5°, which is the complement of 22.5° (22.5° + 67.5° = 90°). Therefore, it was necessary to complement the input angular value for generating the value of the sine function for angles in quadrant II. The value of the sine function for angles located in quadrant III were generated in the same manner as for angles in quadrant I. However, values of the sine function for angles located in quadrant IV were generated by complementing the input angular value as described hereinabove for angles in quadrant II.

The values of the cosine function for angles between 0° and 360° may be generated by employing the same table of values as that shown for computing the sine function (Table 2). The basic difference is that the address is complemented for angles located in quadrants I and III instead of quadrants II and IV. This relationship is shown by equation [1] above, wherein the cosine of an angle is equal to the sine of the complement of the given angle. When the value for the cosine function is to be generated for an angle located in quadrants II and IV, it is not necessary to complement the address input angle. FIG. 1 shows the "address form" for angles within each of the four quadrants and the relationship to the sine and cosine functions.

Assume, for example, that the value of the sine function for 22.5° (qaudrant I) is to be computed. The three-digit hexadecimal number, which is supplied as an input to the present invention, is 400 as shown in Table 2. The value in the "device output" column is 0.30FD, and when this number is translated to binary form it becomes: 0011 0000 1111 1101. The most significant digit represents the sign of this number, as stated hereinabove, and is equal to a positive value of 0110 0001 1111 1010. The second number is derived by shifting each digit of the first number one place to the left, and adding a zero to the least significant digit position. This is a well-known technique employed in computer systems where the most significant digit is representative of the sign of the value which follows. When 0110 0001 1111 1010 is translated to decimal form, it is equal to +0.38272. The value of the sine of 22.5°, as found in a standard five-place trigonometric table, is equal to +0.38268. The difference between these two values is 0.00004, and is indicative of a small error in generating the sine of this particular angle. The amount of error varies for different angles, but is always a very small number.

If the value of the sine function is to be computed for an angle of 112.5°, then the input angular value is 22.5° and must be complemented, as shown hereinabove. From Table 2, an angle of 22.5° in hexadecimal form is equal to 400. This value is complemented by the well-known two's complement process which is explained in greater detail in COMPUTER ORGANIZATION AND PROGRAMMING, 1969, by C. W. Gear on pages 26 through 29. The value of the complement of 400 is equal to C00 (67.5°). According to Table 2, an input angular value supplied to the read-only memory of C00 will produce an output value of 0.7646. This number when translated to binary form becomes: 0111 0110 0100 0110. Again the most significant digit represents the sine of this number and is equal to a positive value of 1110 1100 1000 1100. When this number is translated to decimal form, it is equal to +0.92401. The value for the sine of 67.5° is 0.92388. The difference in these two values is equal to 0.00013.

Assume, for example, that the cosine of 67.5° is to be generated. The input angular value is C00, and must be complemented as stated hereinabove, for generating the cosine of an angle in quadrant I. The complement of C00 is 400 and the output value is 0011 0000 1111 1101. Once the sign digit is taken into consideration, and the number is shifted one digit position to the left, then the value of the cosine of 67.5° is 0110 0001 1111 1010 in binary form. The value of this number in decimal form is equal to +0.38272. The cosine of 67.5°, as found in a five-place trigonometric table is equal to 0.38268. Again it may be seen that the difference between these two values is a very small number.

Accordingly, it may be readily appreciated from the discussion hereinabove that values for the sine and cosine functions of angles between 0° and 360° may be generated by addressing a read-only memory, which has stored therein values for the sine of angles between 0° and 90°, with a true or complementary form of a binary number representative of the input angle. The circuitry employed within the preferred embodiment, which was constructed, will be described in detail under the section entitled CIRCUITS hereinbelow.

CIRCUITS

Figure 5:
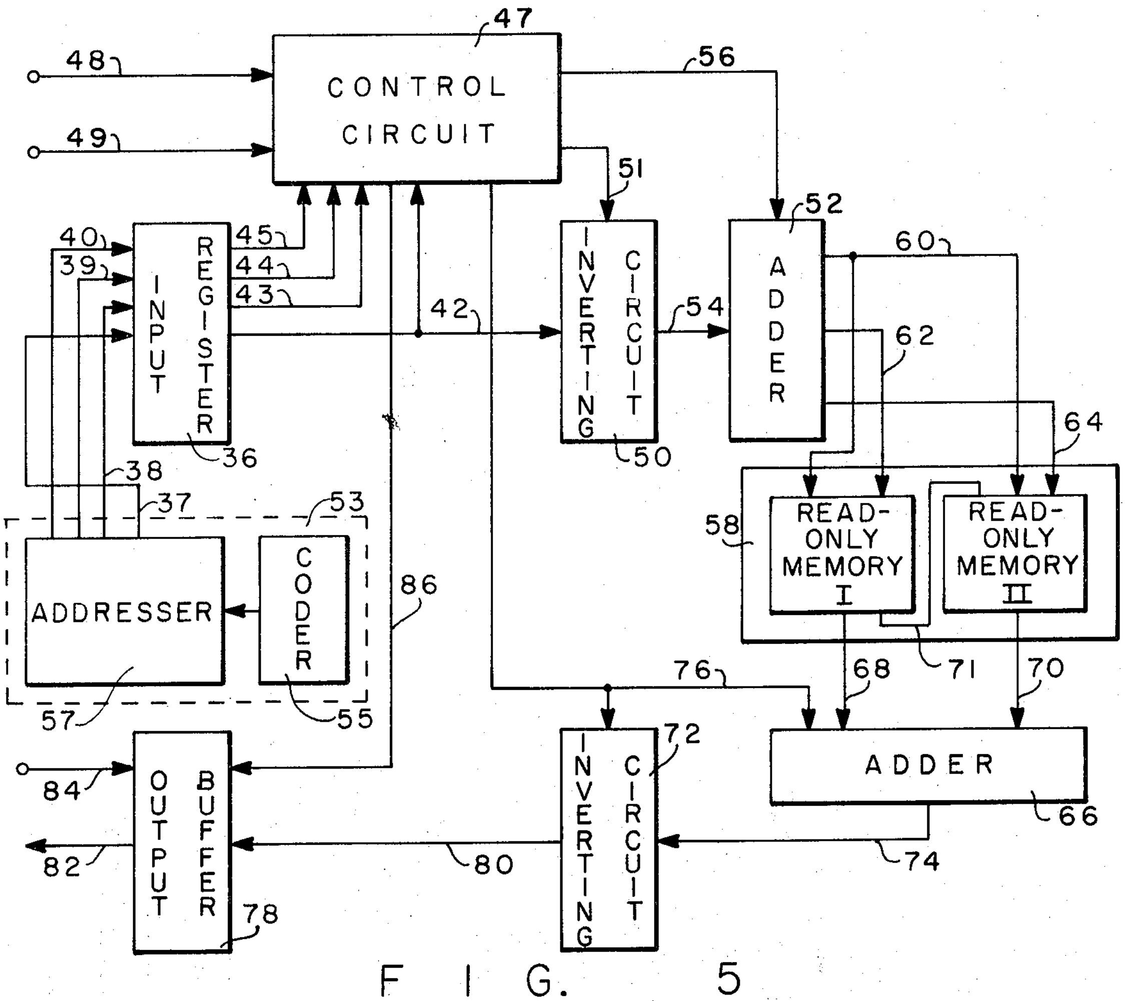
FIG. 5 is a block diagram of a device constructed in accordance with principles of the present invention.

FIG. 5 is an overall block diagram of the circuits of the present invention. The 12-digit binary number representative of the input angle is generated by a coder circuit 55 and transmitted to an addressing means 57. The coder circuit and the addressing means may both be part of a single system such as a digital computer 53. The outputs from the digital computer (or any other such system) 53 are supplied to an input register 36 by means of lines 37. The quadrant input signals are supplied to register 36 on lines 38 and 39. Input register 36 is employed herein as a temporary storage device for the input angle binary number and the quadrant input signals, and is loaded with data upon the application of a load-data signal on line 40. Register 36 is constructed of a conventional manner and may comprise a plurality of flipflops therein. A more detailed explanation of the structure of one register which may be employed in this manner is shown on pages 343 and 344 of PULSE, DIGITAL, AND SWITCHING WAVEFORMS, 1965, by Millman and Taub. Assuming for this description that register 36 is of the type shown in Millman and Taub, the load-data signal on line 40 is connected to each of the flipflops within register 36, and the flipflops change to the state of the respective input signals when the load-data signal is applied on line 40.

The outputs of the flipflops within register 36 are provided on the group of output lines 42 and on lines 43, 44 and 45. The signals on lines 42 comprise the 12-digit binary number, and the signals on lines 43, 44 and 45 comprise the quadrant input signals. The signal on line 43 is the inverse of the signal on line 44. More particularly, line 43 is connected to the "one" output of the flipflop which is responsive to the quadrant input signal on line 38; and line 44 is connected to the "zero" output of the same flipflop. Lines 42 are connected to a control circuit 47 and an inverting circuit 50. Lines 43, 44 and 45 are connected as inputs to control circuit 47. It is the purpose of circuit 47 to control the operation of the circuits of this invention, and this circuit will be explained in greater detail with the description of FIG. 6. A signal is supplied to circuit 47, via line 48, for determining the function generation; wherein a high-level voltage causes the generation of the sine function, and a low-level voltage causes the generation of the cosine function. A signal is supplied to circuit 47, via line 49, for selecting the device output binary number in true binary or complementary form. A high-level voltage causes the selection of the complement of the output answer, and a low-level voltage causes the selection of the true binary form of the output answer.

It is the purpose of circuit 50 to invert the input binary number when complementing; and this circuit is activated by a low-level voltage from control circuit 47 via line 51. A one is to be added to the least significant digit of a binary number for purposes of performing the two's complement of the number. Adder 52 is disposed at the output of inverting circuit 50 for this purpose. The 12-digit binary number is supplied from inverting circuit 50 to adder 52 via lines 54, and the one is added as a result of a high-level voltage supplied to the adder from control circuit 47 via line 56.

As discussed hereinabove a read-only memory is provided within this invention for storing values of the sine function between 0° and 90°. Read-only memory 58 is disposed at the output of adder 52 for this purpose. The read-only memory is divided into two parts (ROM-I and ROM-II) as described hereinabove. The 12-digit binary number, which is supplied to adder 52 via lines 54, is divided into three groups of four binary digits each at the output of adder 52. The first group is supplied on lines 60 to ROM-I and ROM-II. The second group is supplied on lines 62 to ROM-I; and the third group is supplied on lines 64 to ROM-II.

The values in the "SinB" column of Table 2 are supplied from ROM-I to a portion of the inputs of an adder 66 via lines 68. The values in the "CosB'·SinC" column of Table 2 are supplied from ROM-II to another portion of the inputs of adder 66 via lines 70. A single output from ROM-I is connected to an input of ROM-II via line 71 to disable ROM-II when the value of the input angle is between 87.87° and 90°. The signal on line 71 comprises the least significant digit of the binary number provided at the output of ROM-I. Adder 66 performs the addition operation as illustrated in equation [4] hereinabove. The values in the "device output" column of Table 2 are supplied from adder 66 to inputs of inverting circuit 72 via lines 74. Line 76 is connected from control circuit 47 to inputs of adder 66 and inverting circuit 72 for effecting the complementation of negative output values.

It should be pointed out at this juncture of the description that an alternate process of complementing a binary number is employed within this invention for complementing negative output values. The well-known two's complement of a binary number is derived by inverting the number and adding one in the least significant digit position. However, the same result may be derived by subtracting one from the least significant digit position and then inverting the number. For example, assume that the number 1011 is to be complemented:

| | |
|---|---|
| 0100 | is an inversion of this number, |
| +1 | add one, and |
| 0101 | is the two's complement of 1011. |

By subtracting one from 1011, the remainder is 1010, and an inversion of this number is 0101; which is also the two's complement of 1011.

The subtraction operation of the alternate-complementing process is effected by storing the values in ROM-I which are each less in magnitude than actually required for the function generation. When the output answer is desired in true binary form, high-level voltage is supplied on line 76 to adder 66 to compensate for the reduced magnitude of the binary number from ROM-I which yields the answer at its exact value. When the output answer is negative and desired in complementary form, the voltage on line 76 does not bring about the magnitude compensation within adder 66 and the binary number is transferred to inverting circuit 72, via lines 74, at the reduced magnitude; and circuit 72 inverts the binary number to thereby produce the two's complement. Inverting circuit 72 is inversely responsive to the signal on line 76. That is, when the voltage is high on line 76 for magnitude compensation within adder 66, inverting circuit 72 does not invert the binary number supplied thereto on line 74. When the voltage on line 76 is low, adder 66 does not compensate for the reduced magnitude; and inverting circuit 72 inverts the binary number supplied thereto.

The output from inverting circuit 72 is supplied to output buffer 78 on lines 80. The final answer from the device of the present invention is supplied from output buffer 78 on lines 82 when a signal is supplied on line 84. As described hereinabove a sign digit is provided in the most significant digit position of the final answer. The sign digit is provided as an input to the output buffer 78 on line 86 from control circuit 47.

In operation, the angle whose sine or cosine values are desired is inserted into coder 55 by any suitable means. Although no inputs to coder 55 are shown, it is understood that information may be applied to coder 55 by means of switching devices, a keyboard device or any other suitable information input terminal. The angular information received by coder 55 is converted into a numerical value which represents that angle. As mentioned above, values for the sine of 4,096 equally spaced angles from 0° to 90° are stored in memory 58. Each of these angles are represented in this equipment by a unique digital number which, in binary form, lies between 0000 0000 0000 and 1111 1111 1111. Coder 55 converts the value of the angle which may be expressed in any desired form such as degrees in decimal form; degrees, minutes and seconds, radians or the like, into its unique digital representation and transmits that representation to addressing circuit 57.

Assume, for example, that it is desired to generate the sine of 22.5°. The combined information representing the angle of 22.5° in quadrant I, which is present on lines 37, 38 and 39, is loaded into register 36 upon the application of the load-data signal from addresser 57 to the register via line 40. The binary number representing 22.5° is supplied on lines 42 from register 36 to circuits 47 and 50. The quadrant input signals representing quadrant I are supplied on lines 43, 44 and 45 from register 36 to circuit 47. A low-level voltage is applied on line 48, from any suitable source, to cause the generation of the sine function. Since the sign of the value for the sine function in quadrant I is positive, the level of the voltage applied on line 49 to circuit 47 will have no effect on the form of the output answer. Circuitry controlling this will be explained in greater detail hereinbelow.

As described in the THEORY portion of this description, the binary number representative of the input angle is not complemented prior to addressing the memory when the sine function is to be generated for angles in quadrant I. Therefore, voltage is applied on lines 51 and 56 in a manner which does not activate inverting circuit 50 and adder 52, respectively. More particularly, a high-level voltage is applied on line 51 to circuit 50, and a low-level voltage is applied on line 56 to adder 52. The binary number present at the output of adder 52 is the same number as that applied as an input on lines 37.

Referring to Table 2 in conjunction with this example, the input hexadecimal number representative of 22.5° is 400 (or 0100 0000 0000 in binary form). The four digit binary number present on lines 60 is 0100, which represents the most significant hexadecimal digit (4) in the address B column; the binary number present on lines 62 is 0000, which represents the least significant hexadecimal digit (0) in the address B column; and the binary number present on lines 64 is 0000, which represents the hexadecimal digit in the address C column. The binary numbers present on lines 60 and 62 (0100 and 0000) are provided as an input to ROM-I, which is the variable B of equation [4]. The binary numbers present on lines 60 and 64 (0100 and 0000) are provided as an input to ROM-II, which are the variables B' and C, respectively, of equation [4]. The binary number provided at the output of ROM-I on lines 68 and 71 in response to the given address is 0110 0001 1111 1000. The least significant digit of this number (0) is applied on line 71 to enable ROM-II. The remaining 15 most significant digits of this number are provided as an input to adder 66 via lines 68. It is pointed out that when the binary number comprising the 15 most significant digits is applied to adder 66, the binary digit in the $2^1$ position of the original 16-digit binary number from ROM-I is applied to the $2^0$ position at the input of adder 66. The binary number which is actually applied to adder 66 for this example is 011 0000 1111 1100. A space is provided in the most significant digit position for the sign digit which will be added in output buffer 78. The binary number provided at the output of ROM-II on lines 70 for this example is 0000 0000.

Adder 66 adds 011 0000 1111 1100 and 0000 0000 together, and compensates for the reduced magnitude by adding a one to the least significant digit position. The operation described hereinabove may be better understood from the summary below.

```
B
0100      0000      inputs to ROM-I
B'        C
0100      0000      inputs to ROM-II

  0110    0001   1111   1000   output from ROM-I
   011    0000   1111   1100   input to adder 66 from ROM-I

                 0000   0000   input to adder 66 from ROM-II

                           1   input from line 76
   011    0000   1111   1101   output from adder 66.
```

Since the voltage on line 76 was at a high level (one), inverting circuit 72 passes the binary number 011 0000 1111 1101 unchanged to buffer 78 via lines 80. A sign digit of zero is added, within buffer 78, to the most significant digit position as a result of low-level voltage (zero) being applied on line 86 from circuit 47. The binary number provided on output lines 82, when a pulse is provided on line 84, is 0011 0000 1111 1101. This number in hexadecimal form is equal to 30FD. The equipment (not shown) which accepts the output value interprets the value as being fractional, whereby the final answer is 0.30FD. As may be seen from Table 2, this is the value in the "device output column" which corresponds to a "device input angle" of 22.5°.

Figure 6:
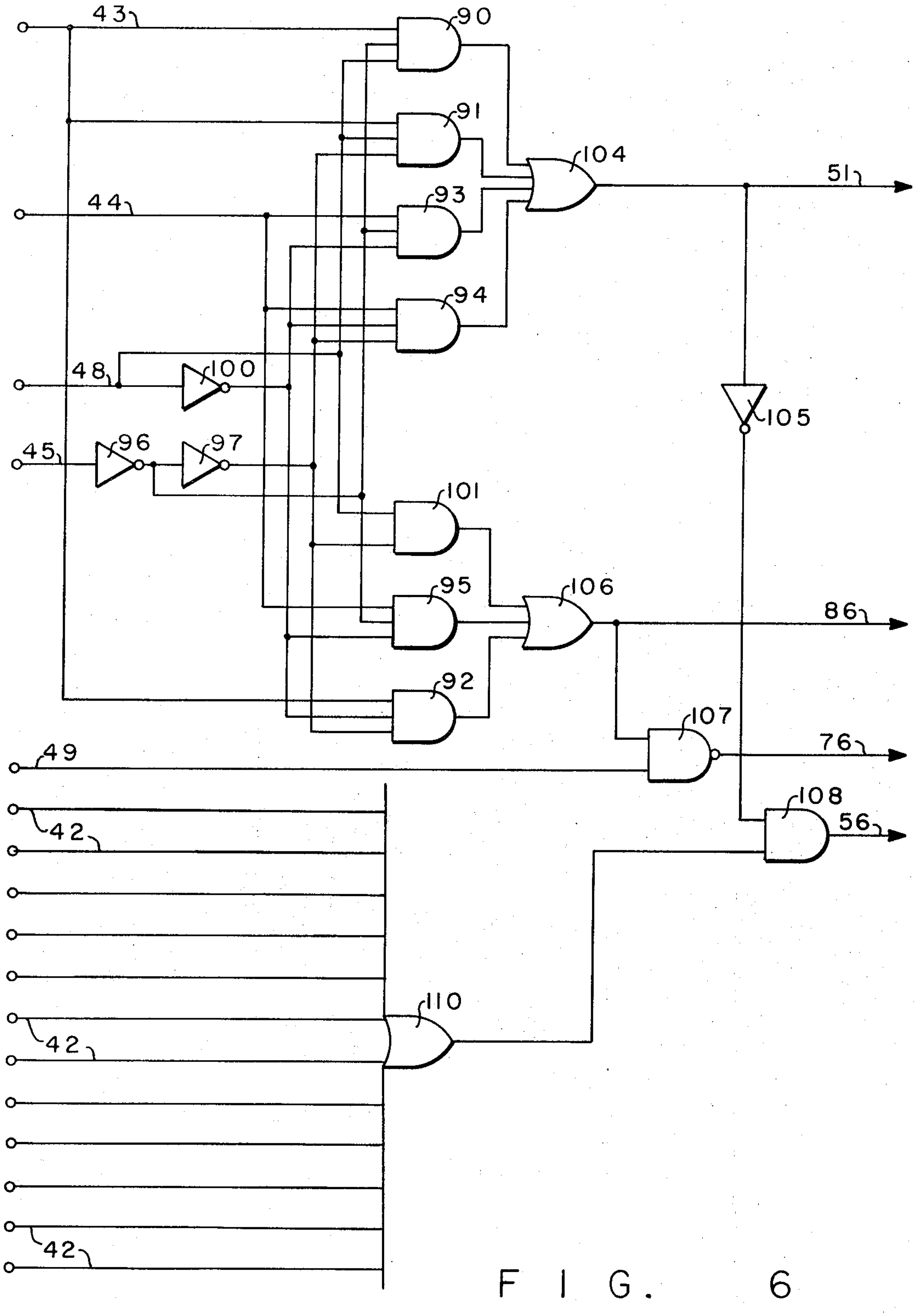
FIG. 6 is a logic diagram of a control circuit employed in this invention.

FIG. 6 is a logic diagram of control circuit 47. Lines 43, 44 and 45 are connected to outputs of register 36 and supply the quadrant input signals to the control circuit. Line 43 is connected to a first input of AND gates 90, 91 and 92; line 44 is connected to a first input of AND gates 93, 94 and 95; and line 45 is connected to the input of inverter 96. The output of inverter 96 is connected to a second input of AND gates 90, 93 and 95, and to the input of inverter 97. Line 48 is connected to the input of inverter 100, to a first input of AND gate 101, a second input of AND gate 91, and a third input of AND gate 90. The output of inverter 100 is connected to a second input of AND gates 92 and 94, and to a third input of AND gates 93 and 95. The output of inverter 97 is connected to a second input of AND gate 101 and a third input of AND gates 91, 92 and 94.

The output of AND gates, 90, 91, 93 and 94 are connected, respectively, to the four inputs of OR gate 104. The output of OR gate 104 is connected to line 51 and to an input of inverter 105. The output of AND gates 92, 95 and 101 are connected, respectively, to the three inputs of OR gate 106. The output of OR gate 106 is connected to line 86 and a first input of NAND gate 107. Line 49 is connected to the second input of NAND gate 107, and the output of NAND gate 107 is connected to line 76. The output of inverter 105 is connected to a first input of AND gate 108. The group of 12 lines 42, from register 36, are connected to the 12 inputs of OR gate 110, respectively. The output of OR gate 110 is connected to the second input of AND gate 108. The output of AND gate 108 is connected to line 56.

It is the primary function of control circuit 47 to control the operation of the individual circuits of this invention. The quadrant input signals, which are temporarily stored in register 36, are supplied on lines 43, 44 and 45 from the register. The sine and cosine selection signal is supplied on line 48, and the true and complementary output format selection signal is supplied on line 49. The relationship between the input signals on line 38, 39, 43, 44, 45 and 48 with respect to the quadrant in which the input angle is located will be more fully understood from Table 3 below.

TABLE 3

| | Quadrant input signals | | | | | |
|---|---|---|---|---|---|---|
| | Input to register 36 | | Output from register 36 | | | |
| Function-quadrant | Line 38 | Line 39 | Line 43 | Line 44 | Line 45 | Sine and cosine selection line 48 |
| Sine: | | | | | | |
| I | 0 | 0 | 0 | 1 | 0 | 1 |
| II | 0 | 1 | 0 | 1 | 1 | 1 |
| III | 1 | 0 | 1 | 0 | 0 | 1 |
| IV | 1 | 1 | 1 | 0 | 1 | 1 |
| Cosine: | | | | | | |
| I | 0 | 0 | 0 | 1 | 0 | 0 |
| II | 0 | 1 | 0 | 1 | 1 | 0 |
| III | 1 | 0 | 1 | 0 | 0 | 0 |
| IV | 1 | 1 | 1 | 0 | 1 | 0 |

The signal provided on line 49 is at a high level (one) when the output data is to be complemented, and is at a low level (zero) when the output data is to be provided in true binary form.

Assume, for example, that the sine of 22.5°, which is located in quadrant I, is to be generated. The voltage on lines 43 and 45 will be at a low level (zero), and the voltage on line 44 will be at a high level. The voltage on line 48 will be at a high level (one) for the sine function generation. Also, assume that the output value is to be in true binary form, then the voltage on line 49 will be at a low level (zero). With the voltages at the levels as stated herein, all three inputs to AND gate 90 will be at a high level (one), and the output thereof will likewise be at a high level (one). The outputs of AND gates 91, 92, 93, 94, 95 and 101 will all be at a low level (zero) for this state of the input signals. Therefore, the output of OR gate 104 will be at a high level (one), and the output of OR gate 106 will be at a low level (zero).

The high-level voltage from OR gate 104 is provided as an input to inverting circuit 50, via line 51, and causes the input angle binary number to pass through the inverting circuit unaltered. This is valid since the input angle is not to be complemented for angles in quadrant I. The high-level voltage on line 51 will cause the output of inverter 105 to be at a low level (zero). This will cause the output of AND gate 108 to be at a low level, and this low-level voltage will thereby prevent adder 52 from adding a one to the least significant digit position of the input angle binary number. This is valid since a one is to be added only when complementing the input binary number.

The low-level voltage from OR gate 106 is provided as an input to output buffer 78, via lines 86, and indicates that the output value is a positive number. This is valid since the sign of the value for the sine of 22.5° is positive. The two inputs of NAND gate 107 are both at a low level (zero), which causes a high level signal to be supplied on line 76. As stated hereinabove, a one is to be added to the values from ROM-I when the output value is not complemented. However, if a high-level voltage is provided on line 49, which indicates that the output value is to be complemented, and a high-level voltage is provided on line 86, which indicates that the output value is a negative number, then the signal on line 76 will be at a low level. Therefore, it may be seen that the output value is complemented when it is a negative number and high-level voltage is provided on line 49.

At this juncture of the description it should be printed out that a problem arises in computing the signe of 90° and 270°, and the cosine of 0° and 180°. The input angle binary number at 0°, 90°, 180° and 270° is:

0000 0000 0000

The quadrant input signals in conjunction with the sine and cosine selection signal determine whether or not the input binary number is to be complemented. If this number is to be complemented, then the output from inverting circuit 50 would be:

1111 1111 1111

If a one is added to the lowest order position by adder 52, the number would change back to all zeros. Therefore, a provision is made in the circuitry to inhibit the addition of a one in the complementing process when the input binary number is all zeros. The process of inverting a binary number and not adding a one is used for deriving the well-known one's complement.

OR gate 110 detects the input binary number at an all zero state. The output of OR gate 110 provides a low-level voltage at the input of AND gate 108 and thereby inhibits line 56 from going to a high level.

The state of the signals on output lines 51, 56, 76 and 86 in response to the input signals supplied to this circuit (as illustrated in Table 3 above) will be more fully understood from Table 4 below.

TABLE 4

| Function-quadrant | Without complementing the output values | | | | Complementing the output values | | | |
|---|---|---|---|---|---|---|---|---|
| | Line 51 | Line 56 | Line 76 | Line 86 | Line 51 | Line 56 | Line 76 | Line 86 |
| Sine: | | | | | | | | |
| I | 1 | 0 | 1 | 0 | 1 | 0 | 1 | 0 |
| II | 0 | 1 | 1 | 0 | 0 | 1 | 1 | 0 |
| III | 1 | 0 | 1 | 1 | 1 | 0 | 0 | 1 |
| IV | 0 | 1 | 1 | 1 | 0 | 1 | 0 | 1 |
| Cosine: | | | | | | | | |
| I | 0 | 1 | 1 | 0 | 0 | 1 | 1 | 0 |
| II | 1 | 0 | 1 | 1 | 1 | 0 | 0 | 1 |
| III | 0 | 1 | 1 | 1 | 0 | 1 | 0 | 1 |
| IV | 1 | 0 | 1 | 0 | 1 | 0 | 1 | 0 |

Figure 7:
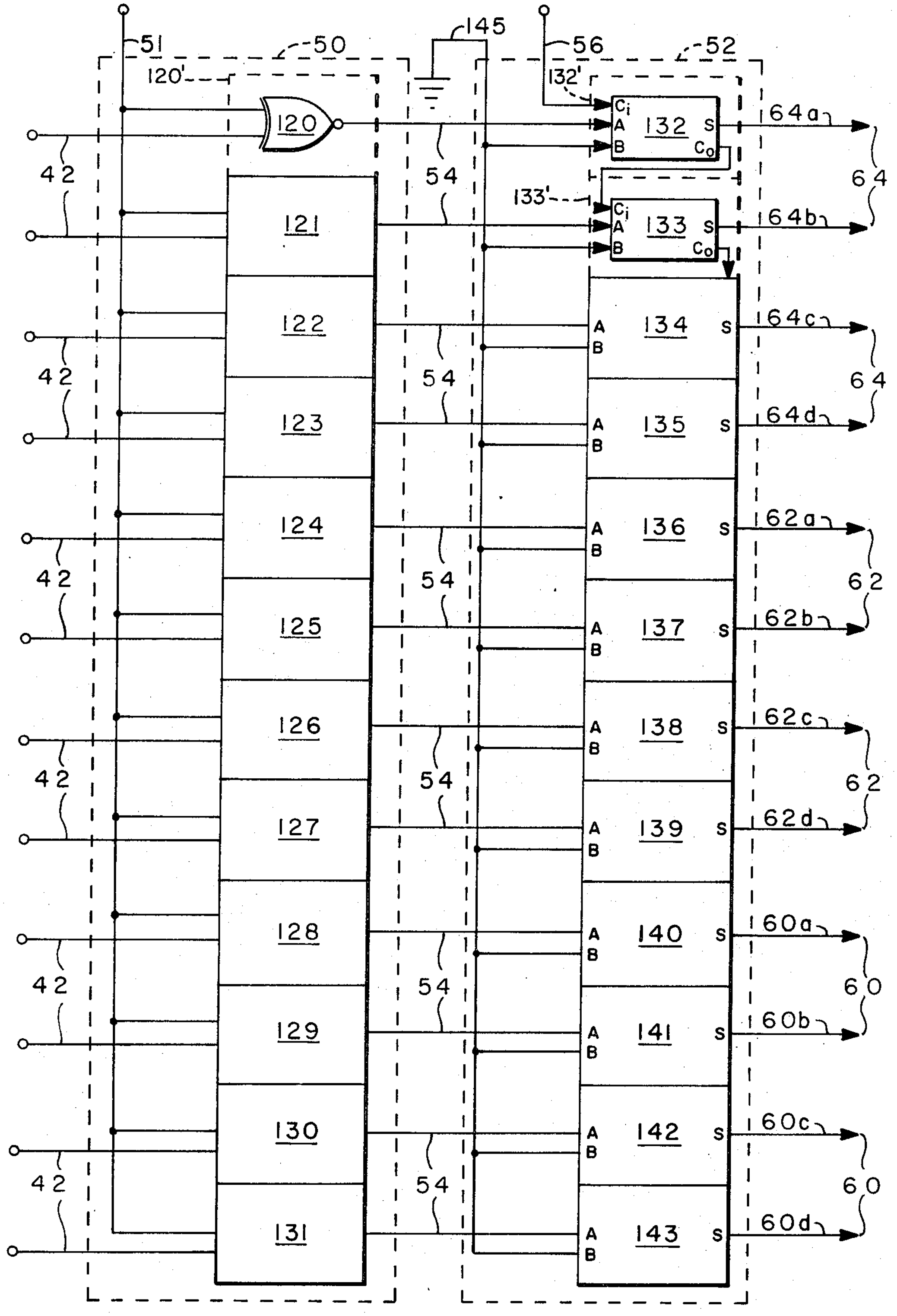
FIG. 7 is a logic-block diagram of a complementing circuit and a binary adder.

FIG. 7 is a logic-block diagram of inverting circuit 50 and adder 52. The group of 12 lines 42, which transfer the 12-digit binary number from register 36 to circuit 50, are connected to a first input of individual inverting circuits 120 through 131, respectively. Line 51 is connected to the second input of all the inverting circuits. An individual inverting circuit 120, as shown within dashed line 120'; comprises an exclusive OR gate with an inverting output. The output of each of inverting circuits 120 through 131 is connected to an input of each of adder circuits 132 through 143, respectively, via lines 54. An individual adder circuit 132 comprises a full adder. The structure of a full adder, which may be employed in this invention, is illustrated more fully in PULSE, DIGITAL, AND SWITCHING WAVEFORMS, 1965, by Millman and Taub on pages 338 through 340. Assuming for this description that full adders 132 through 143 are of the type shown in Millman and Taub, the binary digit supplied to the A input is added to the binary digit supplied to the B input. The $C_i$ input is adapted for receiving a pulse indicative of a carry input from the lower order position.

According to the preferred embodiment of the present invention, lines 54 are connected to the A inputs of adders 132 through 143; the B inputs are all connected to ground potential via line 145 (ground potential is the same as the low-level voltage, 0, as referred to herein); and the $C_i$ input of adder 132 is connected to line 56. The S output of the full adders represents the sum of the binary digits supplied to the A, B and $C_i$ inputs. The $C_o$ output supplies a signal indicative of a carry to the next higher order position. The $C_o$ output of adder 132 is connected to the $C_i$ input of an identical full adder 133. The full adders within the remaining circuits 134 through 143 are connected in the same manner as shown within the dashed lines 132' and 133' which enclose full adders 132 and 133, respectively. The S output of full adders 132 through 135 are connected to lines 64*a* through 64*d*, respectively; the S output of full adders 136 through 139 are connected to lines 62*a* through 62*d*, respectively; and the S output of full adders 140 through 143 are connected to lines 60*a* through 60*d*, respectively.

In operation the 12-digit binary number, which is indicative of the input angular value, is transferred from register 36 via lines 42 to the inputs of inverting circuits 120 through 131. It is a characteristic of the exclusive OR gates employed herein that high-level voltage (1) is provided at the output when the two input terminals have the same voltage level applied thereon. However, if the voltage levels applied on the two inputs are at different levels, low-level voltage (0) is provided at the output. The binary number is inverted by circuits 120 through 121 when low-level voltage (0) is applied on line 51, and the binary number is passed through the inverting circuits unchanged when a high-level voltage (1) is applied on line 51. The operation, as used in this invention, may be better understood from the truth table below.

| OPERATION | LINE 51 | LINES 42 | LINES 54 |
|---|---|---|---|
| INVERT | 0 | 0 | 1 |
| INVERT | 0 | 1 | 0 |
| NOT INVERT | 1 | 0 | 0 |
| NOT INVERT | 1 | 1 | 1 |

The binary number from circuits 120 through 131 is supplied to the A inputs of full adders 132 through 143, respectively, via lines 54. The binary number applied to the B inputs of full adders 132 through 143 is 0000 0000 0000 as a result of the connection of the B inputs to ground potential via line 145. When high-level voltage (1) is applied on line 56 to the $C_1$ input of full adder 132, a one is added to the binary number from circuits 120 through 131.

Figure 8:
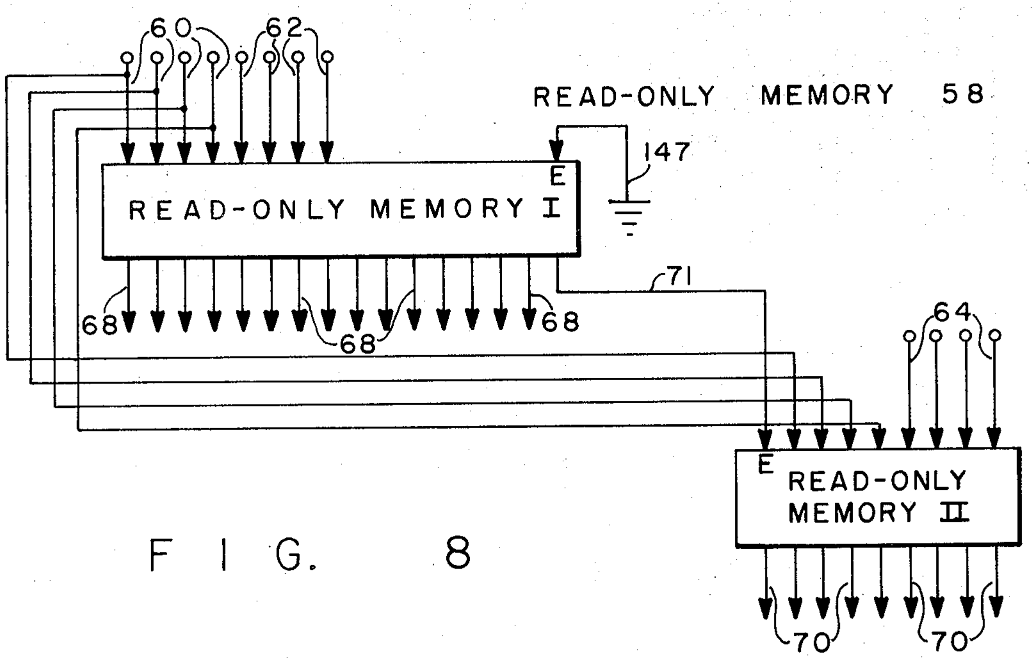
FIG. 8 is a block diagram of read-only memories connected in accordance with the principles of the present invention.

FIG. 8 is a block diagram of read-only memory 58. Lines 60 are connected to the four most significant digit positions of the address input to ROM-I and ROM-II; lines 62 are connected to the four least significant digit positions of the address input to ROM-I; and lines 64 are connected to the four least significant digit positions of the address input to ROM-II. The enable input E of the read-only memories enable the generation of binary numbers at the output terminals of the memories when low-level voltage (0) is applied to the enable input E. The enable input E of ROM-I is connected to ground potential via line 147, and the enable input E of ROM-II is connected to the least significant digit position of the output of ROM-I via line 71.

In operation, binary numbers are generated at the output of ROM-I, which are indicative of the "SinB" values stored therein, when corresponding B address values are provided at the input on lines 60 and 62. ROM-I is always enabled since the enable input E is connected directly to ground potential. Likewise, binary numbers are generated at the output of ROM-II, which are indicative of the "CosB'·SinC" values stored therein, when corresponding B' and C address values are provided at the input on lines 60 and 64, respectively. However, when the B address value is between 87.87° and 90°, the least significant digit of the binary number at the output of ROM-I is a one (high-level voltage). This voltage is applied to the enable E input of ROM-II which will cause the binary number generated at the output of ROM-II to be 0000 0000.

With reference to Tables 1 and 2 hereinabove, it may be seen that the binary number generated at the output of ROM-I in response to an input angular value of 87.87° is 1111 1111 1101 0111. The least significant digit of this number is a one, and will disable ROM-II via line 71. As may be seen in the "SinB" column of Table 2, all values stored in ROM-I which are responsive to input angular values between 87.87° and 90° have a one in the least significant digit position. Therefore, the output of ROM-II will be 0000 0000 for input angular values within this range. As may be seen in FIG. 3, curve 24 has flat portions thereof as a result of the disablement of ROM-II for angles between 87.87° and 90°. The alternate operation described herein provides for a more accurate generation of values for the sine and cosine functions at angles near 90°.

Figure 9:
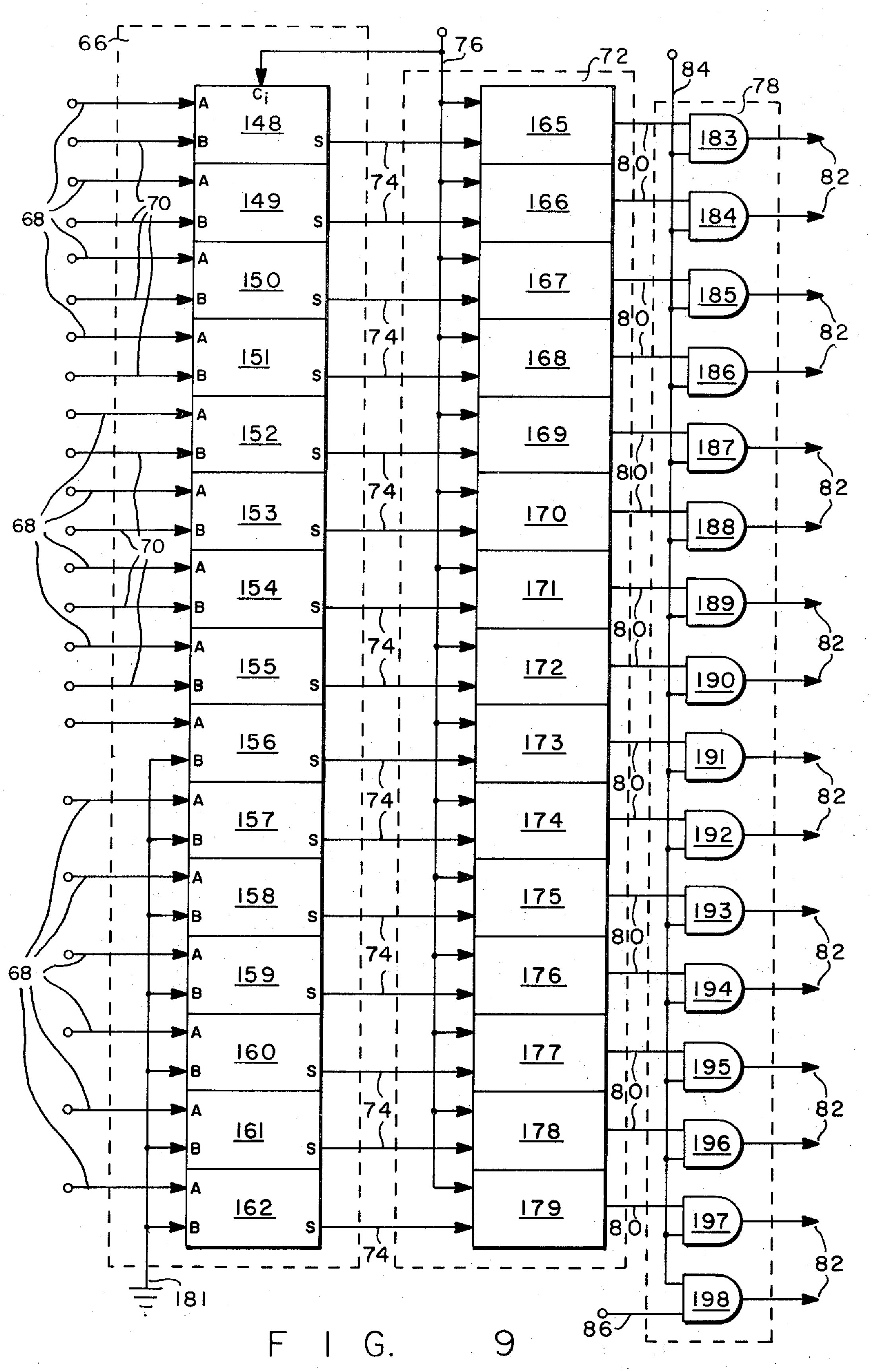
FIG. 9 is a logic-block diagram of a binary adder, a complementing circuit, and an output buffer.

FIG. 9 is a logic-block diagram of adder 66, inverting circuit 72, and output buffer 78. Adder 66 is constructed in the same manner as that described hereinabove for adder 52, and comprises 15 full adders 148 through 162. Inverting circuit 72 is constructed in the same manner as that described hereinabove for inverting circuit 50, and comprises 15 individual inverting circuits 165 through 179. The group of 15 lines 68 from ROM-I are connected to the A inputs of full adders 148 through 162, and the group of eight lines 70 from ROM-II are connected to the B inputs of full adders 148 through 155. The B inputs of full adders 156 through 162 are connected to ground potential via line 181. Again it is pointed out that ground potential is a low-level voltage, or 0, within the circuits of the present invention.

Line 76 is connected to the $C_i$ input of full adder 148, and to one of the two inputs of inverting circuits 165 through 179. The S outputs of full adders 148 through 162 are connected to the second input of inverting circuits 165 through 179, respectively, via lines 74. The outputs of inverting circuits 165 through 179 are connected to one of two inputs of AND gates 183 through 197, respectively, via lines 80. Line 86, which provides the sign digit to buffer 78, is connected to one of two inputs of AND gate 198. The second input of AND gates 183 through 198 is connected to line 84. The outputs of AND gates 183 through 198 are connected to output lines 82.

In operation, the 15-digit binary number applied to the A inputs of full adders 148 through 162 from ROM-I is added to the eight-digit binary number applied to the B inputs of full adders 148 through 155 from ROM-II. If the output answer is not to be complemented, high-level voltage (1) is applied to the $C_i$ input of full adder 148 to add a one to the answer. The B inputs to full adders 156 through 162 are connected to ground potential to assure that extraneous noise does not generate an erroneous answer from adder 66. Again assuming that the output answer is not to be complemented, then the resultant binary number from adder 66 is passed through inverting circuits 165 through 179 unchanged, and applied to the inputs of AND gates 183 through 197 via lines 80. The value of the sign digit is applied to the input of AND gate 198. Upon the application of a pulse on line 84, AND gates 183 through 198 are enabled. All AND gates which have high-level voltage (1) applied from inverting circuit 72 will provide high-level voltage (1) at the respective outputs when the pulse is applied on line 84.

Assume that the output answer is negative and is to be complemented. Low-level voltage is applied on line 76 which will not cause the addition of a one in adder 66, and will cause inverting circuit 72 to invert the binary number. As was shown hereinabove, this process will provide the output answer in two's complement form.

It is understood that the specific embodiment of the present invention described in the foregoing specification is illustrative and not restrictive, and that the breadth and scope of the present invention is indicated by the appended claims.

What I claim is:

1. Apparatus for generating values of the sines and cosines of angles, said apparatus comprising a memory having stored therein information in digital form representative of the values of the sine of selected angles between 0° and 90°, said memory being addressable for the recovery of information pertaining to any desired angle by a number unique to that desired angle, means for converting information representative of a desired angle into said number unique to that angle, a first complementing means having its input connected to the output of said conversion means and its output connected to the input of said memory, said unique numbers being so chosen that the complement of a number which represents one angle represents the complement of that one angle, means for rendering said complementing means operative, said angles being represented by the sum of two separate angles, one of which two separate angles is substantially larger than the other, the sine of said sum of two angles being represented by $\mathrm{Sin}(B+C) = \mathrm{Sin}B + \mathrm{Cos}B'\ \mathrm{Sin}C$, said memory comprising a first portion and a second portion, said first portion having stored therein information representing the values of SinB and said second portion having information stored therein representing the values of CosB' SinC, and means connected to the output of said memory for producing the values of the Sin(B + C).

2. The apparatus defined in claim 1 wherein said means for producing the values of Sin(B + C) comprises an adder, and means for connecting the outputs of said first and said second portions to two inputs of said adder.

3. The apparatus defined in claim 2 which includes a second complementing means having its input connected to the output of said adder and its output connected to the output of said apparatus.

4. Apparatus for generating the sines and cosines of angles which lie between 0° and 360°, said apparatus comprising:

a. A memory having a first and second part, said memory containing stored therein the values of the sines of selected angles which lie between 0° and 90° with the first part containing the values of SinB and the second part containing values of CosB' SinC;

b. means for addressing the memory with information representative of the angle whose values are required;

c. first means for complementing the addressing information representative of the sine of angles lying in the second and fourth quadrants and representative of the cosine of angles lying in the first and third quadrant;

d. second means for complementing the output from the memory when the addressing information is representative of the sine of angles lying in the third and fourth quadrants and representative of the cosine of angles lying in the second and third quadrants; and e. means for combining the outputs of the first and second parts into a single value for application to said second means for complementing.

5. The apparatus defined in claim 4 further including means responsive to input information defining the quadrant in which the selected angle lies for controlling the first and second means for complementing to render them operative.

6. The apparatus defined in claim 4 further including means for connecting the least significant digit of the output of said first part of said memory to an enabling input of said second part of said memory, whereby said second part of said memory is enabled and disabled in accordance with the value of the least significant digit recovered from said first part of said memory.

* * * * *